(12) United States Patent
Nakashin

(10) Patent No.: US 11,175,780 B2
(45) Date of Patent: Nov. 16, 2021

(54) DISPLAY DEVICE, DISPLAY METHOD, AND DISPLAY SYSTEM

(71) Applicant: SEIKO EPSON CORPORATION, Tokyo (JP)

(72) Inventor: Yoshitaka Nakashin, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/662,186

(22) Filed: Oct. 24, 2019

(65) Prior Publication Data
US 2020/0133433 A1 Apr. 30, 2020

(30) Foreign Application Priority Data
Oct. 25, 2018 (JP) .............................. JP2018-201177

(51) Int. Cl.
| | | |
|---|---|---|
| *G06F 3/042* | (2006.01) | |
| *G06F 3/0482* | (2013.01) | |
| *G06F 3/0485* | (2013.01) | |
| *G06F 3/0354* | (2013.01) | |

(52) U.S. Cl.
CPC ........ *G06F 3/0425* (2013.01); *G06F 3/03542* (2013.01); *G06F 3/0482* (2013.01); *G06F 3/0485* (2013.01)

(58) Field of Classification Search
CPC ...................... G06F 3/0488; G09G 2320/0626
See application file for complete search history.

(56) References Cited

U.S. PATENT DOCUMENTS

| | | | | |
|---|---|---|---|---|
| 2003/0193565 A1* | 10/2003 | Wen ........................ | H04N 17/04 | |
| | | | 348/184 | |
| 2006/0132867 A1* | 6/2006 | Sugiyama .............. | G09G 5/003 | |
| | | | 358/504 | |
| 2013/0321307 A1 | 12/2013 | Obana | | |
| 2014/0035843 A1* | 2/2014 | Zo ........................ | G06F 3/03542 | |
| | | | 345/173 | |
| 2014/0063313 A1* | 3/2014 | Choi ................... | H04N 5/23293 | |
| | | | 348/333.02 | |
| 2014/0160076 A1 | 6/2014 | Ichieda | | |
| 2015/0169280 A1* | 6/2015 | Suzuki .................. | H03G 5/025 | |
| | | | 715/716 | |

FOREIGN PATENT DOCUMENTS

| | | |
|---|---|---|
| JP | 2012-018644 A | 1/2012 |
| JP | 2013-246750 A | 12/2013 |
| JP | 2014-115802 A | 6/2014 |
| JP | 2016-110329 A | 6/2016 |

* cited by examiner

*Primary Examiner* — Nan-Ying Yang
(74) *Attorney, Agent, or Firm* — Dority & Manning, P.A.

(57) ABSTRACT

A display device includes: a display unit displaying an image on a display surface; a detection unit detecting a position of a pointing unit on the display surface; and a control unit causing the display unit to display an image based on the position detected by the detection unit. The control unit causes the display unit to display a first image group including a plurality of sample images having different settings of a first attribute from each other and a same setting of a second attribute that is different from the first attribute, the first image group being scrollable in a first direction, and a second image group including a plurality of sample images having a same setting of the first attribute and different settings of the second attribute from each other, the second image group being scrollable in a second direction that is different from the first direction.

14 Claims, 9 Drawing Sheets

FIG. 4
| | TYPE(1) | TYPE(2) | TYPE(3) | TYPE(4) | TYPE(5) | ... |
|---|---|---|---|---|---|---|
| ATTRIBUTE a | | | | | | ... |
| ATTRIBUTE b | | | | | | ... |
| ATTRIBUTE c | | | | | | ... |
| ATTRIBUTE d | △ | □ | ○ | ⏢ | ✕ | ... |
| ... | ... | ... | ... | ... | ... | ... |
FIG. 5
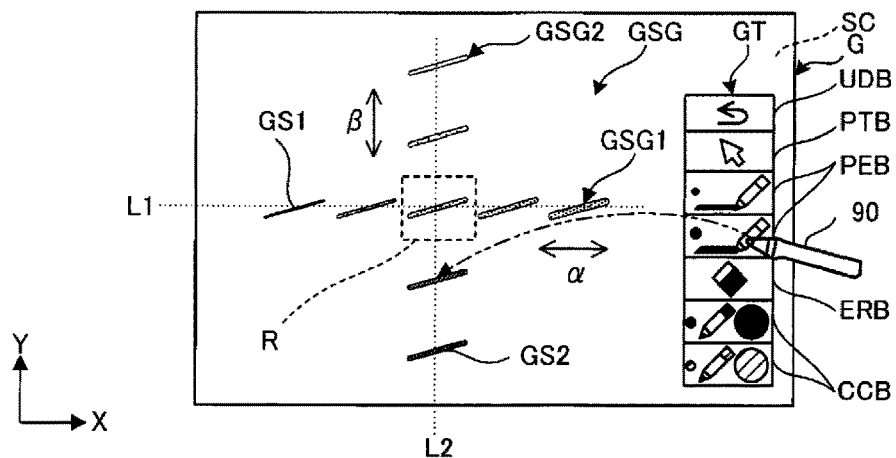
FIG. 6
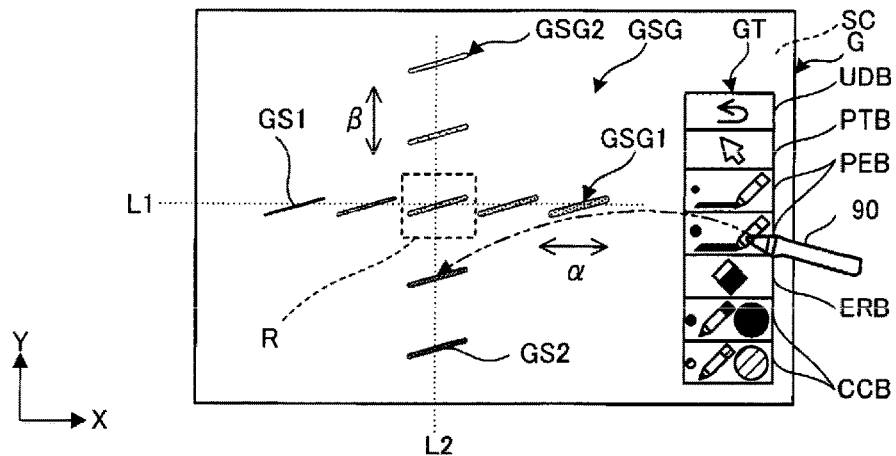

DISPLAY DEVICE, DISPLAY METHOD, AND DISPLAY SYSTEM

The present application is based on, and claims priority from JP Application Serial Number 2018-201177, filed Oct. 25, 2018, the disclosure of which is hereby incorporated by reference herein in its entirety.

BACKGROUND

1. Technical Field

The present disclosure relates to a display device, a display method, and a display system.

2. Related Art

A display device that accepts an operation by a pointing unit such as a pen tool or user's finger on a display surface such as a screen and performs drawing on the display surface is known. For example, a device described in JP-A-2013-246750 displays a drawing area where a line is drawn along a pen input stroke and a setting area for various settings for pen input, when a graffiti input mode in which the user can make graffiti with a pen is selected. In the setting area, designation frames to designate a type, color, and thickness or the like of a drawn line are prepared. When a designation is made with the pen in each designation frame, a confirmation image is displayed in the drawing area.

However, the device described in JP-A-2013-246750 displays a separate designation frame for each attribute for setting and therefore has a problem in that as the number of attributes that need setting increases, the number of operations increases and this increases the operation load on the user.

SUMMARY

A display device according to an aspect of the present disclosure includes: a display unit displaying an image on a display surface; a detection unit detecting a position of a pointing unit on the display surface; and a control unit causing the display unit to display an image based on the position detected by the detection unit. The control unit causes the display unit to display a first image group including a plurality of sample images having different settings of a first attribute from each other and a same setting of a second attribute that is different from the first attribute, the first image group being scrollable in a first direction, and a second image group including a plurality of sample images having a same setting of the first attribute and different settings of the second attribute from each other, the second image group being scrollable in a second direction that is different from the first direction. The control unit decides a setting of the first attribute and the second attribute used for the image based on the position detected by the detection unit, according to selection of a sample image included in the first image group or the second image group.

A display method according to an aspect of the present disclosure includes: displaying, on a display surface, a first image group including a plurality of sample images having different settings of a first attribute from each other and a same setting of a second attribute that is different from the first attribute, the first image group being scrollable in a first direction, and a second image group including a plurality of sample images having a same setting of the first attribute and different settings of the second attribute from each other, the second image group being scrollable in a second direction that is different from the first direction; causing one sample image included in the first image group or the second image group to be selected; deciding the first attribute and the second attribute according to the selection of the one sample image; detecting a position of a pointing unit on the display surface; and displaying, on the display surface, an image having the first attribute and the second attribute that are decided, based on the detected position.

A display system according to an aspect of the present disclosure includes: a display unit displaying an image on a display surface; a detection unit detecting a position of a pointing unit on the display surface; and a control unit causing the display unit to display an image based on the position detected by the detection unit. The control unit causes the display unit to display a first image group including a plurality of sample images having different settings of a first attribute from each other and a same setting of a second attribute that is different from the first attribute, the first image group being scrollable in a first direction, and a second image group including a plurality of sample images having a same setting of the first attribute and different settings of the second attribute from each other, the second image group being scrollable in a second direction that is different from the first direction. The control unit decides a setting of the first attribute and the second attribute used for the image based on the position detected by the detection unit, according to selection of a sample image included in the first image group or the second image group.

BRIEF DESCRIPTION OF THE DRAWINGS

FIG. 4 illustrates an attribute used for drawing.

FIG. 5 illustrates a sample display using two attributes.

FIG. 6 illustrates the sample display after scrolling a first image group.

DESCRIPTION OF EXEMPLARY EMBODIMENTS

Figure 1:
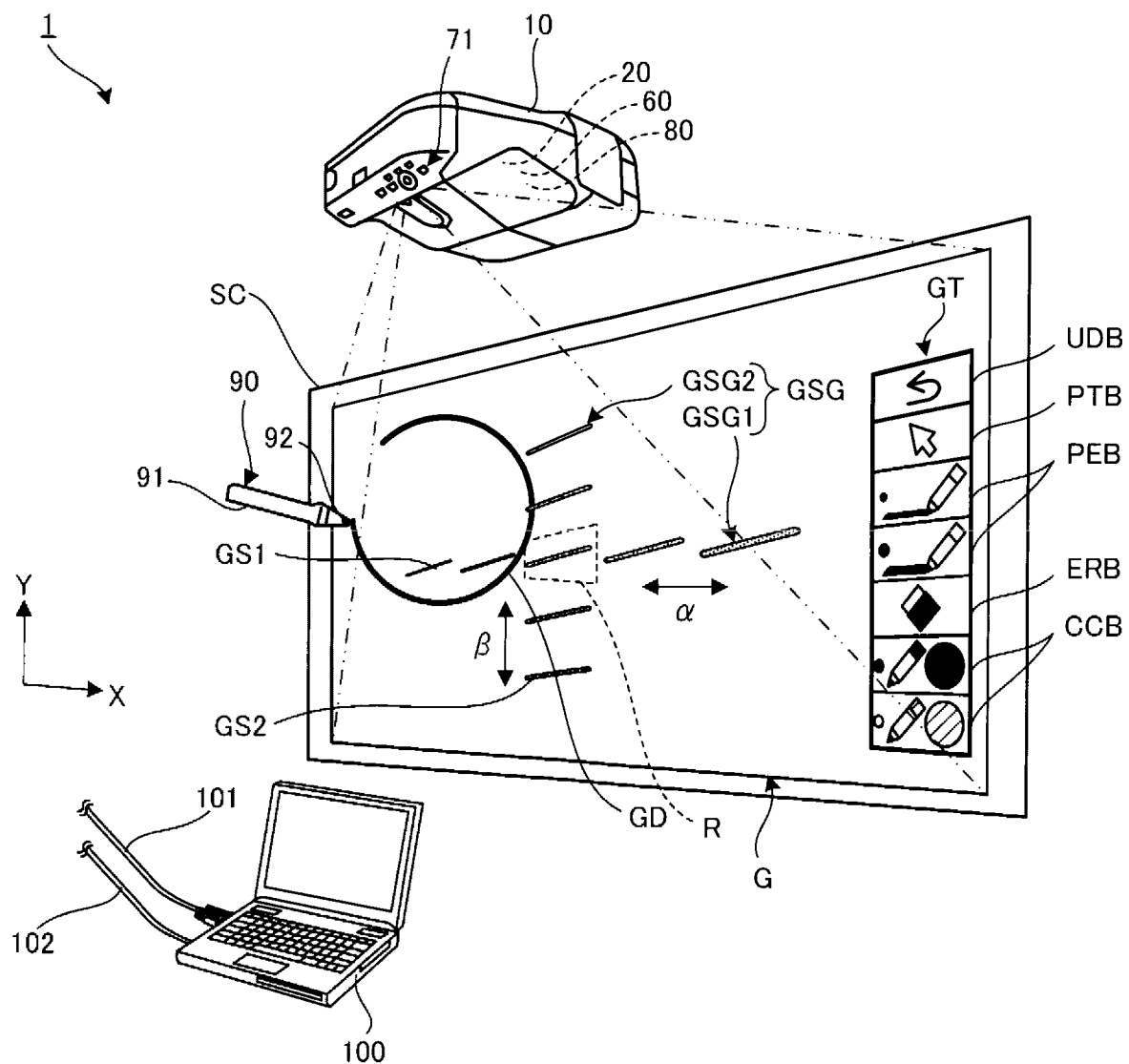
FIG. 1 is a perspective view showing a display system according to an embodiment.

A preferred embodiment of the present disclosure will now be described with reference to the accompanying drawings. In the drawings, the dimension and scale of each part may be different from reality, where appropriate, and may be schematically shown in order to facilitate understanding. The scope of the present disclosure is not limited to the embodiment unless there is any particular description to limit the present disclosure in the following explanation.

1. OUTLINE OF DISPLAY SYSTEM

FIG. 1 is a perspective view showing a display system 1 according to an embodiment. The display system 1 is a projection system having a so-called interactive function. As shown in FIG. 1, the display system 1 includes a display device 10, a pointing unit 90, and a PC 100 as an example of an external device.

In the example shown in FIG. 1, the display device 10 is coupled to the PC 100 via cables 101 and 102. Image information DS is inputted to the display device 10 from the PC 100 via the cable 101. The image information DS may be inputted to the display device 10 from the PC 100 via the cable 102. The external device supplying the image information DS to the display device 10 is not limited to the PC 100 and may be, for example, a DVD (digital versatile disk) player or the like. The external device may be wirelessly coupled to the display device 10. In this case, one or both of the cables 101 and 102 may be omitted.

The display device 10 can display an image G based on the image information DS from the PC 100, onto a screen SC. The image G is, for example, an image displayed on the screen of the PC 100, or the like. In the example shown in FIG. 1, the installation site of the screen SC is, for example, a wall. However, this is not limiting. For example, a floor, a table or the like may be employed. The installation site of the display device 10 is, for example, a ceiling. However, this is not limiting. Not only the ceiling but also a wall, a floor, a table, a dedicated installation stand or the like may be employed.

The display device 10 can execute a drawing mode in which an image GD which is a drawn image based on a trajectory of a position on the screen SC pointed by the pointing unit 90 is displayed on the screen SC. Here, the display device 10 detects a position on the screen SC pointed by the pointing unit 90 and displays the image GD based on the position. The image GD may be displayed singly without displaying the image G based on the image information DS, or may be displayed as superimposed on the image G. Also, the display device 10 may display the image G on the screen SC and, in that state, operate the PC 100 similarly to a pointing device such as a mouse according to the position on the screen SC pointed by the pointing unit 90.

The pointing unit 90 is a pen-type device. The pointing unit 90 has a shaft part 91 and a tip button 92 arranged at the tip of the shaft part 91. The tip button 92 is a switch which turns on by being pressed against the screen SC. An infrared light emitting unit, not illustrated, is provided inside the pointing unit 90. The infrared light emitting unit is driven as the tip button 92 turns on. The infrared light emitting unit includes, for example, a light emitting element such as an infrared LED (light-emitting diode), a light emission control circuit, and a power supply. The infrared light emitting unit periodically emits infrared light, for example, by a method conforming to the IrDA (Infrared Data Association) standard. The light emission is detected by the display device 10. The display device 10 detects the position on the screen SC pointed by the pointing unit 90, based on the position of light emission of the pointing unit 90. The shape of the pointing unit 90 is not limited to the pen-type. The pointing unit 90 may also be a human finger or the like.

When in the drawing mode, the display device 10 displays, on the screen SC, a toolbar GT which is a GUI (graphical user interface) image to cause the display device 10 to execute various functions in response to a pointing by the pointing unit 90. The toolbar GT shown in FIG. 1 includes an undo button UDB, a pointer button PTB, a pen button PEB, an eraser button ERB, and a color choice button CCB. The undo button UDB is a button to undo the last operation and return to the previous state. The pointer button PTB is a button to display a mouse pointer used to select an image or the like. The pen button PEB is a button to select a type of the pen used to draw the image GD. The eraser button ERB is a button to select an eraser tool to erase the drawn image GD. The color choice button CCB is a button to select a color of the pen used to draw the image GD.

The case of using the toolbar GT in the form shown in FIG. 1 will now be described as an example. However, the form of the toolbar GT is not limited to the form shown in FIG. 1. The display device 10 may also display, on the screen SC, an image other than the images G, GD and the toolbar GT, for example, an image based on image information stored in the display device 10, or an image based on image information generated by the display device 10, or the like. The display device 10 can be operated, using an operation panel 71 arranged in the main body of the display device 10, and a remote controller, not illustrated in FIG. 1.

For example, when a predetermined operation is carried out on the toolbar GT, the display device 10 displays, on the screen SC, a sample image group GSG used to set an attribute of the image GD. The sample image group GSG illustrated in FIG. 1 includes a first image group GSG1 including a plurality of sample images GS1 arranged in the direction of width of the screen SC, and a second image group GSG2 including a plurality of sample images GS2 arranged in the direction of height of the screen SC. The plurality of sample images GS1 have different settings of a first attribute from each other and the same setting of a second attribute that is different from the first attribute. The plurality of sample images GS2 have the same setting of the first attribute and different settings of the second attribute from each other. In this way, the plurality of sample images GS1 and the plurality of sample images GS2 have different attributes or different settings of the attributes from each other. Therefore, a sample of a plurality of display forms having different attributes of the image GD can be presented in the form of the sample image group GSG to the user, without the user having to actually change a setting of an attribute to display the image GD.

The "attribute" means a characteristic or feature that is visually identifiable to a human. Specific examples may be color, pattern, character, geometric shape, symbol, or the like. The "attribute" is also a concept including a plurality of types belonging to the same characteristic or feature category. For example, when the attribute is color, it is a concept including types such as red, blue, green, and yellow. The "different attributes" means that two attributes in comparison are indifferent categories from each other. The "different settings of an attribute" means different attributes or that two types in comparison, of the same attribute, are different from each other.

Each of the sample images GS1 and each of the sample images GS2 can accept an operation by the pointing unit 90. As the user selects and operates one sample image GS1 or sample image GS2 from the plurality of sample images GS1 and the plurality of sample images GS2, a setting of an attribute of the one sample image GS1 or sample image GS2 is reflected on a setting of an attribute of the image GD. The attribute of the one sample image GS1 or sample image GS2 includes a first attribute and a second attribute that are different from each other. Therefore, carrying out this operation once can set two attributes of the image GD.

The first image group GSG1 and the second image group GSG2 have an area R where these image groups partly overlap each other. In the area R, one of the sample images GS1 and GS2 is used also as the other. That is, the sample images GS1 and GS2 in the area R are the same as each other. In this example, the first image group GSG1 and the second image group GSG2 are respectively scrollable. When the first image group GSG1 is scrolled, the setting of the first attribute of the sample image GS1 or GS2 in the area R is reflected on the setting of an attribute of the plurality of sample images GS2. Similarly, when the second image group GSG2 is scrolled, the setting of the second attribute of the sample image GS1 or GS2 in the area R is reflected on the setting of an attribute of the plurality of sample images GS1.

2. CONFIGURATION OF DISPLAY DEVICE

Figure 2:
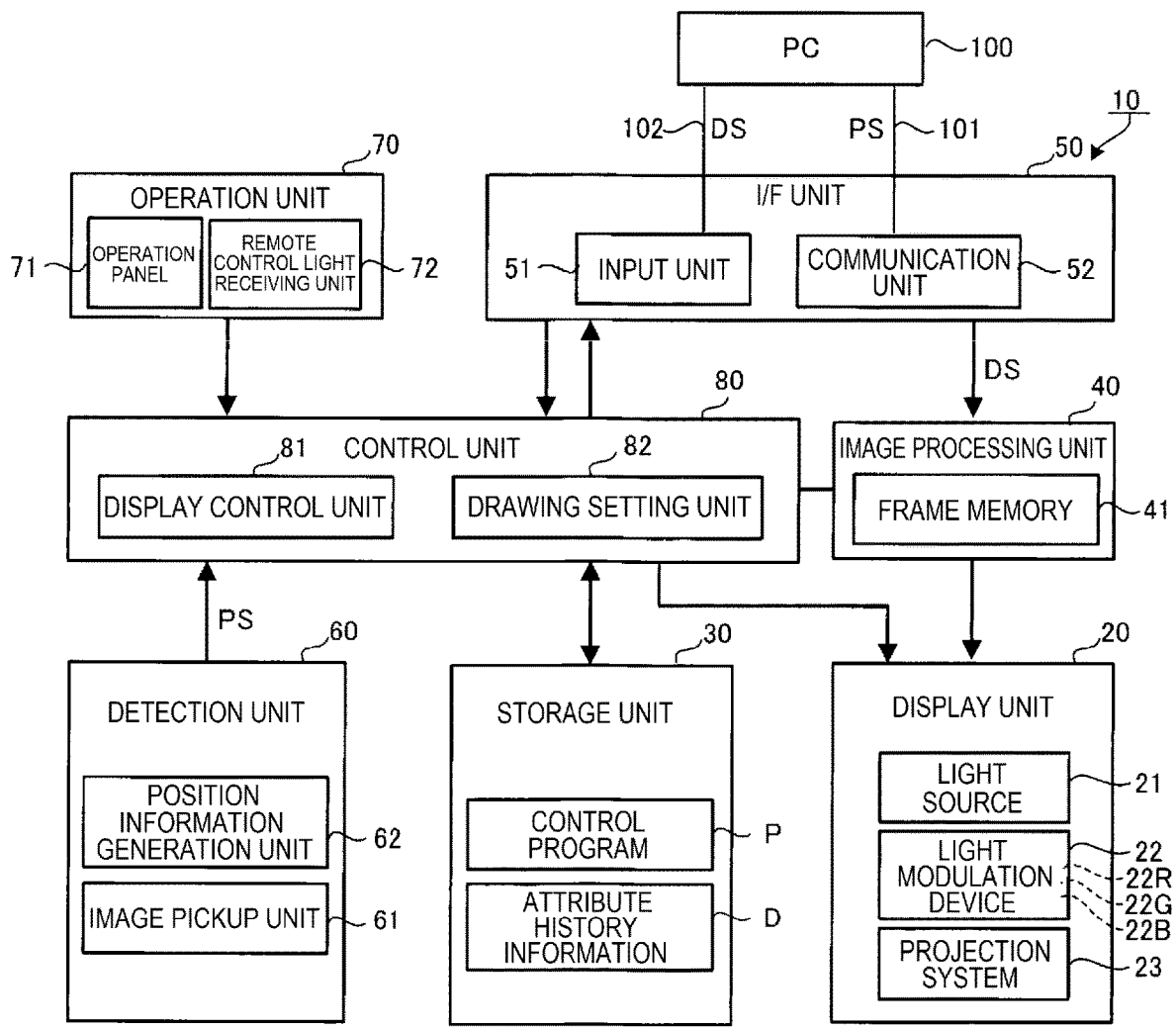
FIG. 2 is a block diagram showing a configuration of a display device according to the embodiment.

FIG. 2 is a block diagram showing the configuration of the display device 10 according to the embodiment. The display device 10 has a display unit 20, a storage unit 30, an image processing unit 40, an I/F (interface) unit 50, a detection unit 60, an operation unit 70, and a control unit 80, as shown in FIG. 2.

The display unit 20 displays an image G on the screen SC, which is a display surface. The display unit 20 has a light source 21, a light modulation device 22, and a projection system 23.

The light source 21 includes, for example, a halogen lamp, xenon lamp, ultra-high-pressure mercury lamp, LED (light-emitting diode), or laser light source or the like. The light source 21 emits, for example, each of red light, green light, and blue light, or emits white light. When the light source 21 emits white light, the light emitted from the light source 21 is reduced in unevenness in luminance distribution by an optical integration system, not illustrated, and is subsequently separated into red light, green light, and blue light by a color separation system, not illustrated, and becomes incident on the light modulation device 22. The light modulation device 22 includes light modulation elements 22R, 22G, and 22B provided corresponding to the red light, green light, and blue light. Each of the light modulation elements 22R, 22G, and 22B includes, for example, a transmission-type liquid crystal panel, reflection-type liquid crystal panel, or DMD (digital mirror device) or the like. The light modulation elements 22R, 22G, and 22B modulate the red light, green light, and blue light, respectively, and generate image light of the respective colors. The image light of the respective colors generated by the light modulation device 22 is combined together into full-color image light by a light combining system, not illustrated. The projection system 23 projects the full-color image light to form an image on the screen SC. The projection system 23 is an optical system including at least one projection lens and may include a zoom lens or a focus lens or the like.

The storage unit 30 is formed of, for example, a hard disk drive or semiconductor memory. The storage unit 30 stores a control program P executed by the control unit 80 and data including attribute history information D processed by the control unit 80. The control program P and the attribute history information D will be described in detail later. The storage unit 30 may also be provided in a storage device outside the display device 10 or in a server or the like.

The image processing unit 40 has a frame memory 41. The image processing unit 40 loads the image information DS from the I/F unit 50 into the frame memory 41, executes various kinds of processing such as resolution conversion, resizing, and distortion correction according to need, and inputs the result to the display unit 20. The image processing unit 40 executes processing based on a signal from the control unit 80, according to need, for example, processing to cause the display unit 20 to display the image GD and the toolbar GT or the like.

The I/F unit 50 has an input unit 51 and a communication unit 52, as an interface that can be coupled to an external device such as the PC 100. The I/F unit 50 may be arranged in the same casing as the main body of the display device 10 or may be arranged in a different casing from the casing of the main body of the display device 10.

The input unit 51 can take an input of the image information DS from the PC 100. Specifically, the input unit 51 is, for example, a D-sub or HDMI interface or the like. A plurality of input units 51 may be provided, and in such a case, the same standard or different standards may be used. The input unit 51 may be wirelessly connected to an external device, for example, via Wi-Fi or Bluetooth or the like, or may be connected to an external device via a LAN (local area network) or the internet or the like. HDMI, Wi-Fi, and Bluetooth are trademarks registered.

The communication unit 52 can be coupled to the PC 100 in such a way as to be able to communicate. Specifically, the communication unit 52 is, for example, a USB interface or the like. A plurality of communication units 52 may be provided, and in such a case, the same standard or different standards from each other may be used.

The detection unit 60 detects a position on the screen SC pointed by the pointing unit 90 and generates position information PS representing the position. The detection unit 60 has an image pickup unit 61 and a position information generation unit 62. The image pickup unit 61 picks up an image of the screen SC. The image pickup unit 61 includes an image pickup element such as a CCD (charge-coupled device) image sensor or CMOS (complementary MOS) image sensor. The position information generation unit 62 generates the position information PS about the position on the screen SC pointed by the pointing unit 90. Specifically, the position information generation unit 62 generates the position information PS based on an output signal from the image pickup unit 61. The position of the pointing unit 90 on the screen SC is represented, for example, by coordinates on a coordinate system set on the screen SC. The position information PS includes information representing the coordinates. The detection unit 60 is not limited to a configuration using an image pickup element as described above, provided that the detection unit 60 can detect a position on the screen SC pointed by the pointing unit 90. For example, the detection unit 60 may have a configuration using a laser light source and a light receiving element.

The operation unit 70 has an operation panel 71 and a remote control light receiving unit 72. The operation panel 71 is provided at an outer casing of the display device 10 and is configured to be able to accept an operation by the user. The operation panel 71 outputs a signal based on an operation by the user. The remote control light receiving unit 72 receives an infrared signal from a remote controller, not illustrated, decodes the infrared signal, and outputs a signal based on an operation on the remote controller.

The control unit 80 has a function of controlling each part of the display device 10 and a function of processing various data. The control unit 80 includes, for example, a CPU (central processing unit) or the like. The control unit 80 executes the control program P stored in the storage unit 30 and thus implements various functions including functional units described below. The control unit 80 may be formed of a single processor or a plurality of processors. A part or all of the functions of the control unit 80 may be implemented by hardware such as a DSP (digital signal processor), ASIC (application-specific integrated circuit), PLD (programmable logic device), or FPGA (field-programmable gate array).

The control unit 80 has a display control unit 81 and a drawing setting unit 82, as functional units. The display control unit 81 executes processing about the display by the display unit 20. More specifically, for example, the display control unit 81 has a function of causing the display unit 20 to display the image GD based on the position information PS, which is the result of detection by the detection unit 60, and causing the display unit 20 to display the image G based on the image information DS from the PC 100. The display control unit 81 also has a sample function to display the sample image group GSG as a sample of a plurality of display forms having different attributes of the image GD. For the display control unit 81, whether to use the sample function or not can be set. The drawing setting unit 82 executes processing about a setting of an attribute of the image GD. More specifically, for example, the drawing setting unit 82 decides a setting of an attribute used for the image GD, in response to an operation on the toolbar GT or the sample image group GSG, and stores, in the storage unit 30, information about the result of use of the setting as the attribute history information D. The attribute history information D may be any information about the attribute history of the image GD and may be of any format.

Figure 3:
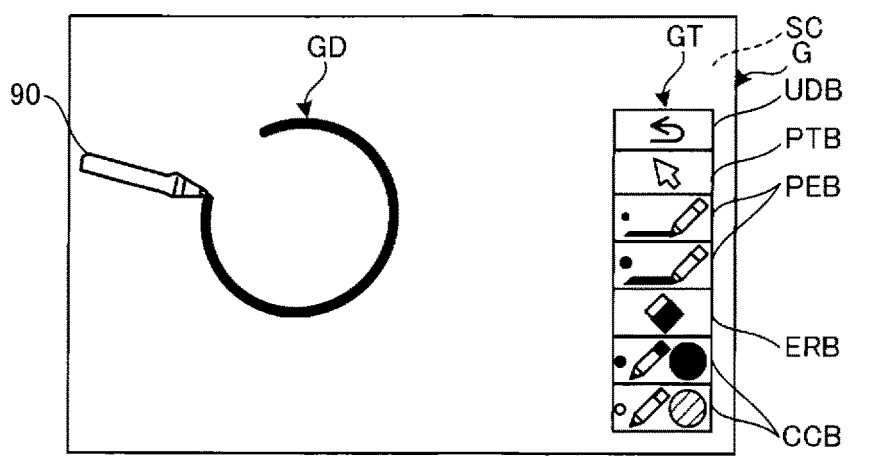
FIG. 3 illustrates a display when a drawing mode is executed.

FIG. 3 illustrates a display shown when the drawing mode is executed. When the drawing mode is executed, the image GD, which is a drawn image based on a trajectory of a position on the screen SC pointed by the pointing unit 90, is displayed, as shown in FIG. 3. At this time, the toolbar GT is displayed on the screen SC, as described above.

FIG. 4 illustrates attributes used for drawing. The display device 10 can set attributes a, b, c, and d, illustrated in FIG. 4, as attributes of the image GD. Each of the attributes a, b, c, and d includes different types (1) to (5) from each other.

Specifically, the attribute a is color and includes different colors from each other as the types (1) to (5). The "different colors" means that two colors in comparison are different from each other in one or some of hue, saturation, and brightness. In FIG. 4, for the sake of convenience of the description, the types (1) to (5) of the attribute a, which is, color, are expressed by different shades of gray from each other on a grayscale. The attribute b is thickness and includes different thicknesses from each other as the types (1) to (5). In the example of the attribute b shown in FIG. 4, thickness increases in order from the type (1) to the type (5). The attribute c is line type and includes different line types from each other as the types (1) to (5). In the example of the attribute c shown in FIG. 4, the type (1) is solid line, the type (2) is dotted line, the type (3) is dashed line, the type (4) is dash-dotted line, and the type (5) is dash-double-dotted line. The attribute d is geometric shape and includes different geometric shapes from each other as the types (1) to (5). In the example of the attribute d shown in FIG. 4, the type (1) is triangle, the type (2) is quadrilateral, the type (3) is circle, the type (4) is trapezoid, and the type (5) is diagonal cross.

The attributes and their types shown in FIG. 4 are an example. The attributes and their types used for the image GD or the sample image group GSG are not limited to the example shown in FIG. 4.

Sample Display Example 1

FIG. 5 illustrates a sample display using two attributes a and b. When the drawing mode is executed, a predetermined operation on the toolbar GT displays a sample image group GSG, for example, as shown in FIG. 5. In the description below, the left-right directions or the directions of width of the screen SC are referred to as an X-axis, and the up-down directions or the directions of height is referred to as a Y-axis, as shown in FIG. 5. The right-hand side in the illustration is the positive side on the X-axis. The left-hand side is the negative side on the X-axis. The top side in the illustration is the positive side on the Y-axis. The bottom side is the negative side on the Y-axis.

The sample image group GSG includes a first image group GSG1 including a plurality of sample images GS1 and a second image group GSG2 including a plurality of sample images GS2. The plurality of sample images GS1 illustrated in FIG. 5 are arranged on a straight line L1 parallel to the X-axis. In contrast, the plurality of sample images GS2 illustrated in FIG. 5 are arranged on a straight line L2 parallel to the Y-axis. The straight lines L1 and L2 intersect each other. Therefore, the first image group GSG1 and the second image group GSG2 partly overlap each other in an area R. In the area R, the sample image GS1 and the sample image GS2 are the same as each other. That is, the sample image GS1 in the area R is the sample image GS2 in the area R. The number of the sample images GS1 forming the first image group GSG1 and the number of the sample images GS2 forming the second image group GSG2 are not limited to the numbers shown in FIG. 5 and may be any number equal to or greater than two.

FIG. 5 illustrates the case where each of the sample images GS1 and the sample images GS2 is a linear line drawing and where the attributes a and b are used as attributes of the line drawing. Here, the attribute b is an example of the first attribute. The attribute a is an example of the second attribute, which is different from the first attribute. Each of the sample images GS1 and the sample images GS2 can accept an operation by the user, based on an instruction or the like from the pointing unit 90. When the operation is carried out, the attribute of the sample image GS1 or the sample image GS2 selected by the operation is set as the attribute of the image GD.

The plurality of sample images GS1 have different settings of the attribute b from each other and the same setting of the attribute a. The foregoing plurality of types of the attribute b are allocated to the plurality of sample images GS1 illustrated in FIG. 5. This allocation may be preset or may be set based on the attribute history information D. Also, the type of the attribute a of the sample image GS2 in the area R is allocated to each of the plurality of sample images GS1 illustrated in FIG. 5. Meanwhile, the plurality of sample images GS2 have the same setting of the attribute b and different settings of the attribute a from each other. The foregoing plurality of types of the attribute a are allocated to the plurality of sample images GS2 illustrated in FIG. 5. This allocation may be preset or may be set based on the attribute history information D. Also, the type of the attribute b of the sample image GS1 in the area R is allocated to each of the plurality of sample images GS2 illustrated in FIG. 5.

The first image group GSG1 is scrollable in directions α, which is an example of the first direction. The second image group GSG2 is scrollable in directions β, which is an example of the second direction different from the first direction. Scrolling of these sample image groups can be executed by an operation such as a touch operation with the pointing unit 90 or a gesture operation.

FIG. 6 illustrates the sample display after scrolling the first image group GSG1. As illustrated in FIG. 6, when the first image group GSG1 is scrolled into a direction α1, the type of the attribute b of the sample image GS1 in the area R is reflected on the type of the attribute b of each of the plurality of sample images GS2. FIG. 6 shows that an increase in the thickness of the sample image GS1 in the area R from the state shown in FIG. 5 results in an increase in the thickness of each sample image GS2.

Figure 7:
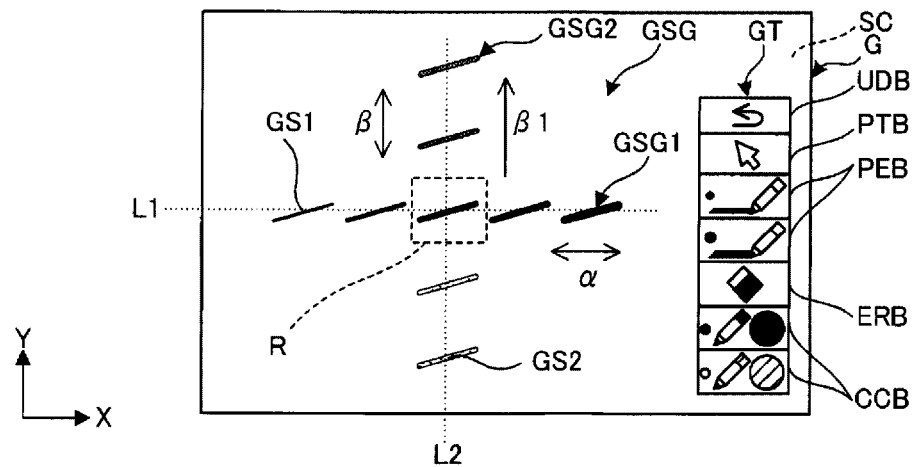
FIG. 7 illustrates the sample display after scrolling a second image group.

FIG. 7 illustrates the sample display after scrolling the second image group GSG2. As illustrated in FIG. 7, when the second image group GSG2 is scrolled into a direction β1, the type of the attribute a of the sample image GS2 in the area R is reflected on the type of the attribute a of each of the plurality of sample images GS1. FIG. 7 shows that a change in the color of the sample image GS2 in the area R from the state shown in FIG. 5 results in a change in the color of each sample image GS1.

The position of the area R can be changed to a different position in the directions α or β. Therefore, a change in the position of the area R, too, can change the type of the attribute a or b of the sample image GS1 or GS2 in the area R, as in the case of scrolling. Also, the position of the area R can be changed in such a way that the user can operate it more easily. The change in the position of the area R may be executed, for example, by an operation with the pointing unit 90, or may be executed based on the result of detection by a sensor such as an infrared sensor, not illustrated, for detecting the positional relationship between the screen SC and the user. To change the position of the area R by an operation with the pointing unit 90, for example, a gesture for the change in the position of the area R can be allocated to an operation with the pointing unit 90. Thus, the position of the area R is changed in response to the gesture. The change in the position of the area R may also be executed, based on the position information PS for every predetermined time.

Figure 8:
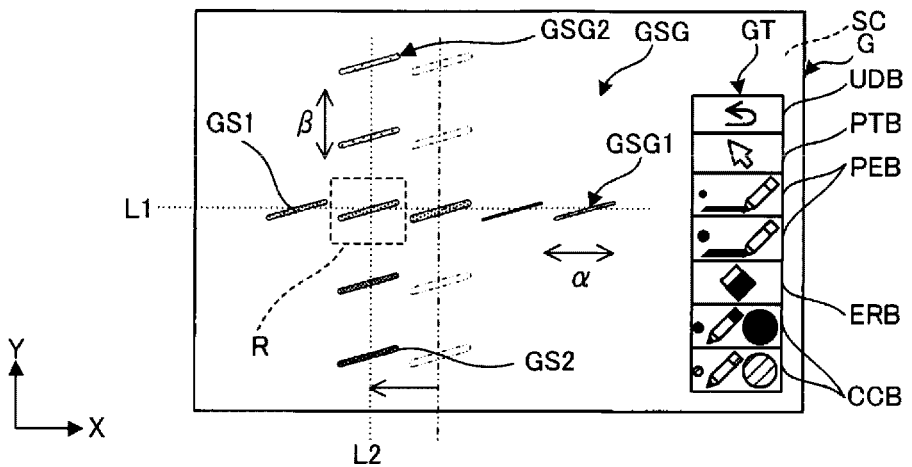
FIG. 8 illustrates the sample display after moving an area where the first image group and the second image group intersect each other.

FIG. 8 illustrates the sample display after moving the area R, where the first image group GSG1 and the second image group GSG2 intersect each other. As illustrated in FIG. 8, when the area R is moved in the directions α, the type of the attribute b of the sample image GS1 in the area R is reflected on the type of the attribute b of each of the plurality of sample images GS2. FIG. 8 shows the case where the area R is moved to the negative side on the X-axis. Here, as in the case illustrated in FIG. 6, it is shown that an increase in the thickness of the sample image GS1 in the area R from the state shown in FIG. 5 results in an increase in the thickness of each sample image GS2. Making such a change in the position of the area R according to the state of use by the user can enhance operability on the first image group GSG1 or the second image group GSG2.

The sample image group GSG may be displayed singly, without displaying the image G based on the image information DS, or may be displayed as superimposed on the image G. However, when the image GD is displayed as superimposed on the image G, it is preferable that the sample image group GSG, too, is displayed as superimposed on the image G. In this case, the visibility or the like of the image GD as superimposed on the image G can be presented to the user in the form of the sample image group GSG.

Although not illustrated, the sample image group GSG may be displayed as superimposed on a background image that is different from the image G. In this case, the attributes of the sample image group GSG are more visible to the user. Therefore, the user can more easily make a determination when confirming or changing the setting or the like of the sample image group GSG. For example, when the sample image group GSG displayed as superimposed on the image G is not so visible, using the background image is effective. The background image is not particularly limited but may be preferably an image that affects the visibility of the sample image group GSG as little as possible. Specifically, for example, a uniform image such as a white image is preferable. Also, the background image may be switched between show and hide, for example, in response to an operation by the user or the like, or may be displayed at a proper time by setting a display period immediately after starting the display of the sample image group GSG.

Sample Display Example 2

Figure 9:
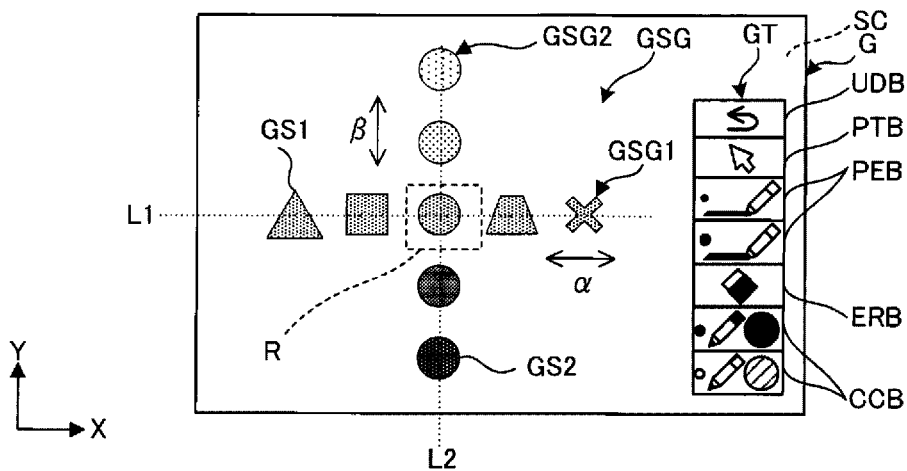
FIG. 9 illustrates another sample display using two attributes.

FIG. 9 illustrates another sample display using the two attributes a and b. While FIG. 5, described above, shows the case where the first attribute is attribute b and where the second attribute is the attribute a, the first attribute and the second attribute are not limited to the attributes illustrated in FIG. 5, provided that these attributes are different from each other. For example, the first attribute may be the attribute a, c, or d, and the second attribute may be the attribute b, c, or d, provided that the first attribute and the second attribute are different from each other. FIG. 9 illustrates the case where the first attribute is the attribute d shown in FIG. 4 and where the second attribute is the attribute a shown in FIG. 4. The attributes used as the first attribute and the second attribute and their types in the sample image group GSG may be preset or may be set based on the attribute history information D. Also, the attributes used as the first attribute and the second attribute and their types in the sample image group GSG may be set by an operation by the user.

Sample Display Example 3

Figure 10:
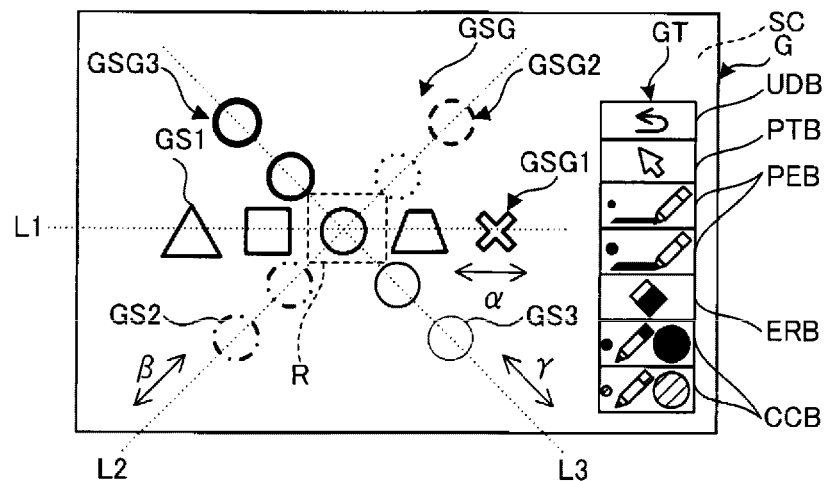
FIG. 10 illustrates a sample display using three attributes.

FIG. 10 illustrates a sample display using three attributes b, c, and d. While FIG. 5, described above, shows the case where the sample image group GSG is displayed using the two attributes a and b, the number of attributes used for the sample image group GSG may be three or more. The sample image group GSG illustrated in FIG. 10 includes a third image group GSG3 including a plurality of sample images GS3, in addition to the first image group GSG1 and the second image group GSG2. The sample image group GSG illustrated in FIG. 10 will now be described, mainly in terms of its difference from the sample image group GSG illustrated in FIG. 5, described above.

In FIG. 10, the straight line L2 along the plurality of sample images GS2 tilts in relation to the X-axis and the Y-axis. The plurality of sample images GS3 illustrated in FIG. 10 are arranged on a straight line L3 tilting to the side opposite to the straight line L2 in relation to the X-axis and the Y-axis. Here, the straight line L3 intersects the straight lines L1 and L2 at the point of intersection of the straight lines L1 and L2. Therefore, the first image group GSG1, the second image group GSG2, and the third image group GSG3 partly overlap each other in the area R.

FIG. 10 illustrates the case where the attributes b, c, and d are used as the attributes of each sample image GS1, each sample image GS2, and each sample image GS3. Here, the attribute d is an example of the first attribute. The attribute c is an example of the second attribute, which is different from the first attribute. The attribute b is an example of a third attribute, which is different from the first attribute and the second attribute. Each sample image GS3 can accept an operation by the user, based on an instruction or the like from the pointing unit 90, similarly to each sample image GS1 and each sample image GS2. When the operation is carried out, the attribute of the sample image GS1, the sample image GS2, or the sample image GS3 selected by the operation is set as the attribute of the image GD.

The plurality of sample images GS1 illustrated in FIG. 10 have different settings of the attribute d from each other and the same setting of the attributes b and c. The plurality of sample images GS2 illustrated in FIG. 10 have the same setting of the attributes b and d and different settings of the attribute c from each other. The plurality of sample images GS3 illustrated in FIG. 10 have the same setting of the attributes c and d and different settings of the attribute b from each other.

In FIG. 10, the directions β in which the second image group GSG2 is scrollable tilt in relation to the X-axis and the Y-axis. The third image group GSG3 is scrollable in directions γ tilting to the side opposite to the directions β in relation to the X-axis and the Y-axis. The directions γ are an example of a third direction, which is different from the first direction and the second direction. An operation to scroll the third image group GSG3 can be executed by an operation such as a touch operation with the pointing unit 90 or a gesture operation, as in the case of the first image group GSG1 and the second image group GSG2. The sample image group GSG illustrated in FIG. 10 can present, to the user, a sample of a plurality of different display forms having three attributes of the image GD, in the form of the sample image group GSG. Also, carrying out an operation on the sample image group GSG once can set three attributes of the image GD.

SAMPLE DISPLAY EXAMPLE 4

Figure 11:
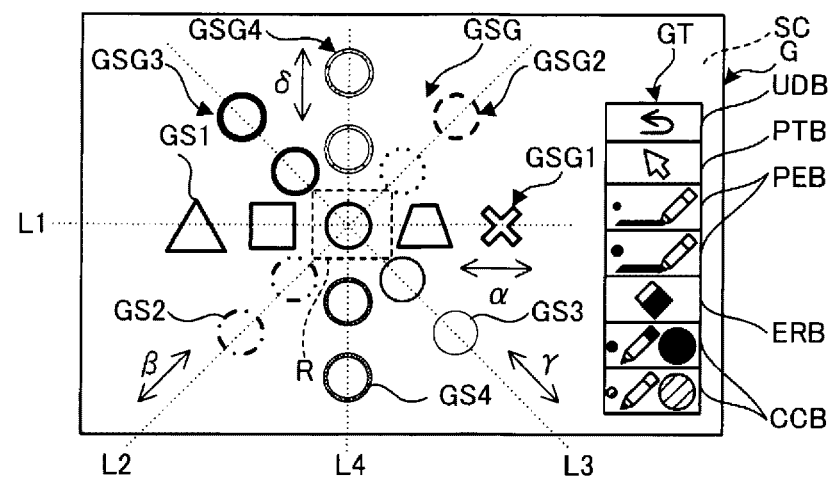
FIG. 11 illustrates a sample display using four attributes.

FIG. 11 illustrates a sample display using four attributes a, b, c, and d. The sample image group GSG illustrated in FIG. 11 includes a fourth image group GSG4 including a plurality of sample images GS4, in addition to the first image group GSG1, the second image group GSG2, and the third image group GSG3 illustrated in FIG. 10, described above. The sample image group GSG illustrated in FIG. 11 will now be described, mainly in terms of its difference from the sample image group GSG illustrated in FIG. 10, described above.

The plurality of sample images GS4 illustrated in FIG. 11 are arranged on a straight line L4 parallel to the Y-axis. Here, the straight line L4 intersects the straight lines L1, L2, and L3 at the point of intersection of the straight lines L1, L2, and L3. Therefore, the first image group GSG1, the second image group GSG2, the third image group GSG3, and the fourth image group GSG4 partly overlap each other in the area R.

FIG. 11 illustrates the case where the attributes a, b, c, and d are used as the attributes of each sample image GS1, each sample image GS2, each sample image GS3, and each sample image GS4. Here, the attribute a is an example of a fourth attribute, which is different from the first attribute, the second attribute, and the third attribute. Each sample image GS4 can accept an operation by the user, based on an instruction or the like from the pointing unit 90, similarly to each sample image GS1, each sample image GS2, and each sample image GS3. When the operation is carried out, the attribute of the sample image GS1, the sample image GS2, the sample image GS3, or the sample image GS4 selected by the operation is set as the attribute of the image GD.

The plurality of sample images GS4 illustrated in FIG. 11 have different settings of the attribute a from each other and the same setting of the attributes b, c, and d. The fourth image group GSG4 is scrollable in directions δ parallel to the Y-axis. The directions δ are an example of a fourth direction, which is different from the first direction, the second direction, and the third direction. An operation to scroll the fourth image group GSG4 can be executed by an operation such as a touch operation with the pointing unit 90 or a gesture operation, as in the case of the first image group GSG1 and the like. The sample image group GSG illustrated in FIG. 11 can present, to the user, a sample of a plurality of different display forms having four attributes of the image GD, in the form of the sample image group GSG. Also, carrying out an operation on the sample image group GSG once can set four attributes of the image GD.

Of the sample display forms illustrated in FIGS. 5, 9, 10, and 11, one form may be preset, or one form may be switched or changed to another form by an operation by the user. The display device 10 in this embodiment can change an attribute used for the sample image group GSG and its type, and can switch the positional relationship between image groups in the sample image group GSG.

Figure 12:
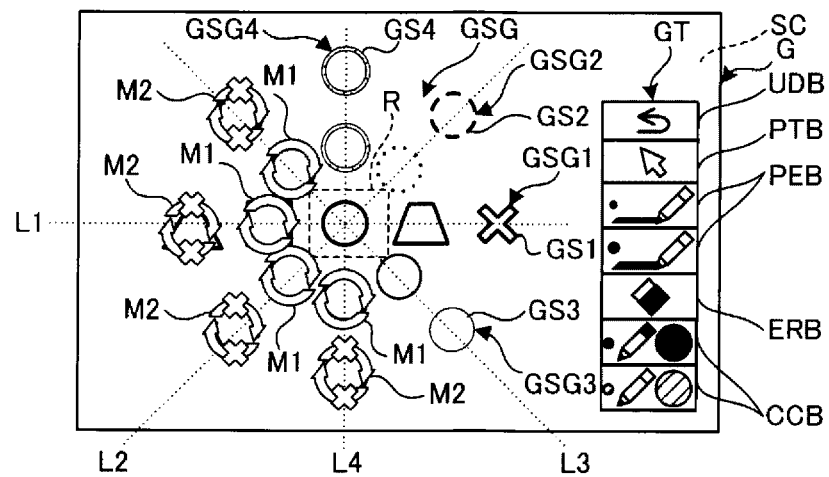
FIG. 12 illustrates a sample display including a mark for attribute change.

FIG. 12 illustrates a sample display including a mark M1 for attribute change. FIG. 12 illustrates the case where the mark M1 is applied to the sample display shown in FIG. 11, described above. On accepting a predetermined operation or when a predetermined condition is satisfied, the display device 10 in this embodiment displays a plurality of marks M1 for attribute change in the sample image group GSG and a plurality of marks M2, as superimposed on the sample image group GSG, as shown in FIG. 12. The plurality of marks M1 are arranged corresponding to each of the first image group GSG1, the second image group GSG2, the third image group GSG3, and the fourth image group GSG4. Similarly, the plurality of marks M2 are arranged corresponding to each of the first image group GSG1, the second image group GSG2, the third image group GSG3, and the fourth image group GSG4. Each mark M1 can accept an operation to change an attribute of the corresponding first image group GSG1, second image group GSG2, third image group GSG3, or fourth image group GSG4. Each mark M2 can accept an operation to hide the marks M1 and M2 without changing any attribute of the sample image group GSG. The arrangement of the marks M1 and M2 is not limited to the arrangement shown in FIG. 12. The number of the marks M2 is not limited to the number shown in FIG. 12 and may be any number equal to or greater than one.

Figure 13:
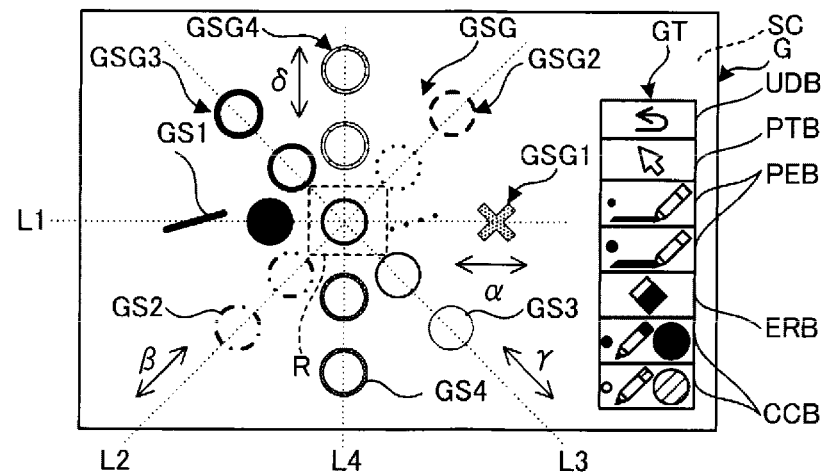
FIG. 13 illustrates the sample display after attribute change.

FIG. 13 illustrates the sample display after attribute change. For example, as the mark M1 corresponding to the first image group GSG1 is operated, an attribute of the first image group GSG1 is changed, as shown in FIG. 13. FIG.

13 illustrates the case where an attribute of the first image group GSG1 is changed to the attribute based on the attribute history information D.

Figure 14:
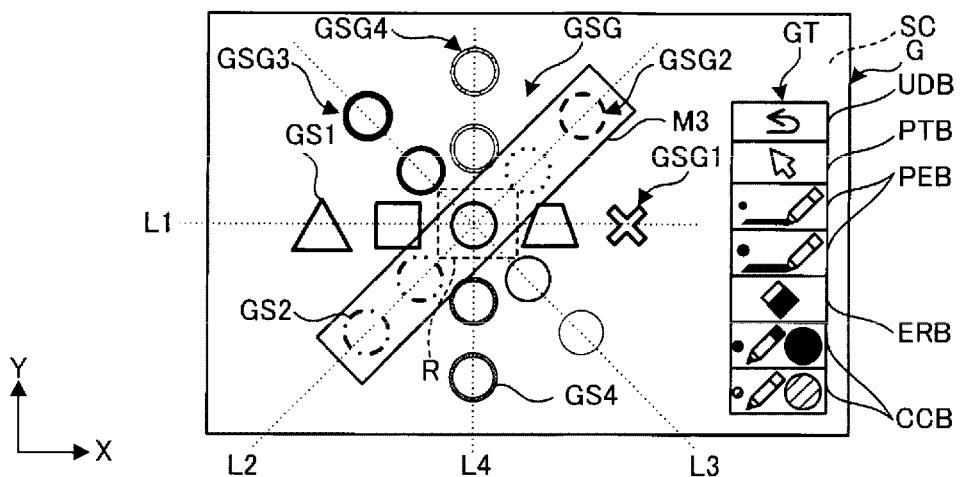
FIG. 14 illustrates a sample display including a mark for attribute switching within the display.

FIG. 14 illustrates a sample display including a mark M3 for attribute switching within the display. FIG. 14 illustrates the case where the mark M3 is applied to the sample display shown in FIG. 11, described above. On accepting a predetermined operation or when a predetermined condition is satisfied, the display device 10 in this embodiment displays the mark M3 for switching the attribute arrangement in the sample image group GSG, as superimposed on the sample image group GSG, as shown in FIG. 14. The mark M3 can be arranged as superimposed on one of the first image group GSG1, the second image group GSG2, the third image group GSG3, and the fourth image group GSG4. The mark M3 is rotatable about the area R. As the mark M3 selecting one of the first image group GSG1, the second image group GSG2, the third image group GSG3, and the fourth image group GSG4 rotates to the position of another image group, the attributes of these image groups can be switched to each other. The shape and size or the like of the mark M3 are not limited to the shape and size or the like shown in FIG. 14.

Figure 15:
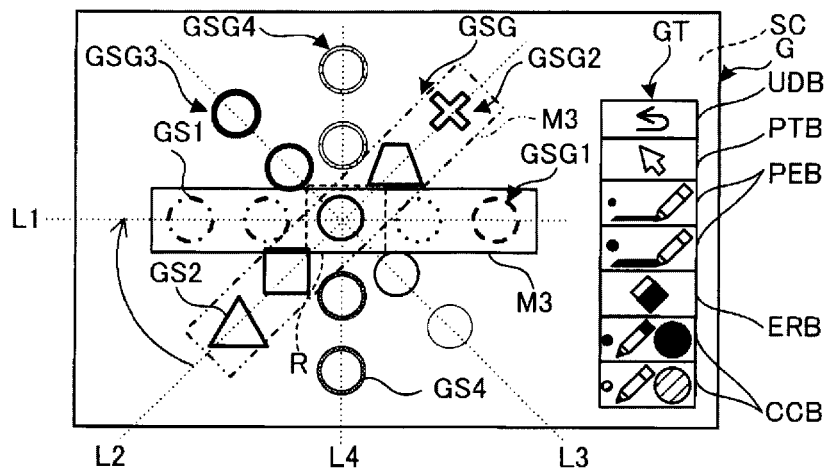
FIG. 15 illustrates the sample display after attribute switching within the display.

FIG. 15 illustrates the sample display after attribute switching within the display. For example, as the mark M3 selecting the second image group GSG2 is rotated to the position of the first image group GSG1, the attribute of the first image group GSG1 and the attribute of the second image group GSG2 are switched to each other, as shown in FIG. 15.

Figure 16:
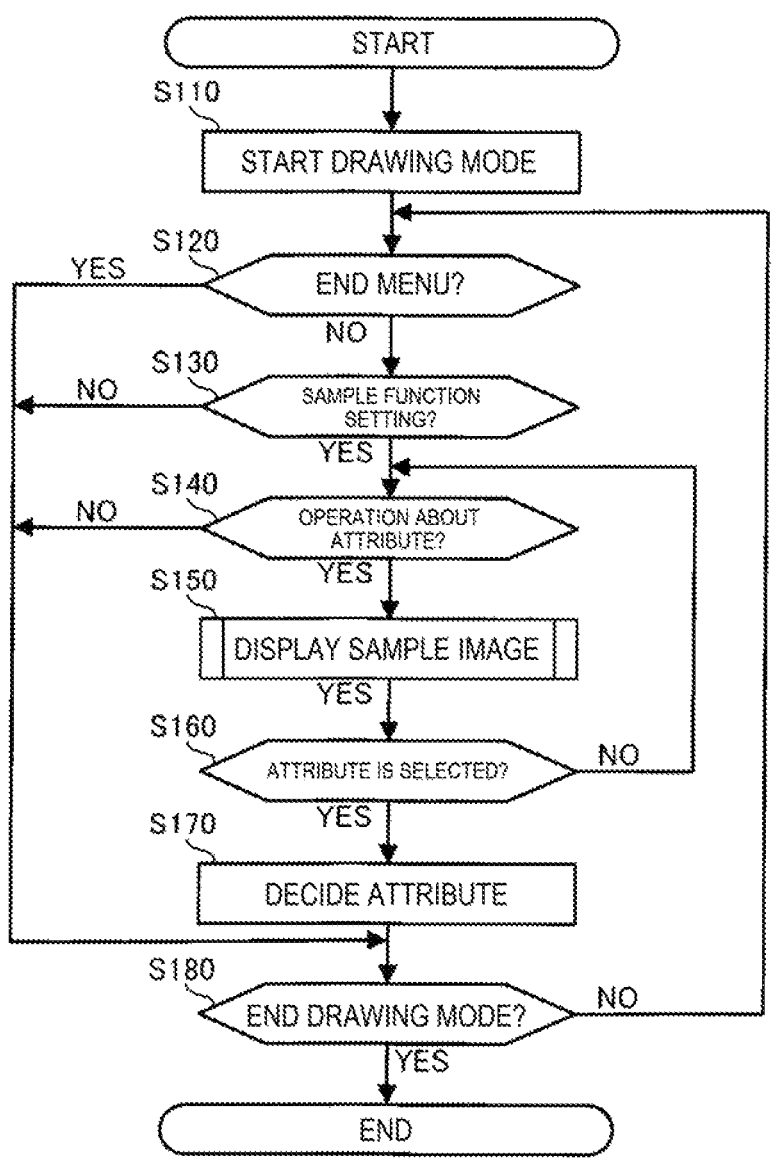
FIG. 16 is a flowchart showing an example of an operation carried out when the display device executes the drawing mode.

FIG. 16 is a flowchart showing an example of an operation carried out when the display device 10 executes the drawing mode. As the display device 10 receives an instruction to execute the drawing mode, first, the control unit 80 starts the drawing mode in step S110, as shown in FIG. 16. Specifically, in step S110, the control unit 80 causes the display unit 20 to display the toolbar GT as a menu and thus creates a state where the image GD based on the result of detection by the detection unit 60 can be displayed.

Next, in step S120, the control unit 80 determines whether an instruction to end the display of the toolbar GT as a menu is given or not. When the instruction to end the display of the menu is not given in step S120, the control unit 80 in step S130 determines whether or not it is the state where a sample function, which is a function about the sample image group GSG, is set. When it is the state where the sample function is set in step S130, the control unit 80 in step S140 determines whether an operation about an attribute of the image GD is carried out on the toolbar GT or not.

When the operation about an attribute is carried out in step S140, the control unit 80 causes the display unit 20 to display the sample image group GSG. At this time, a setting of an attribute used for the sample image group GSG is decided according to the type of the operation on the toolbar GT. For example, when the operation on the toolbar GT is an operation about color, color is set as the first attribute used for the sample image group GSG. In this case, the second attribute used for the sample image group GSG may be any attribute other than color, for example, thickness. Similarly, when the operation on the toolbar GT is an operation about line type, line type is set as the first attribute used for the sample image group GSG. When the operation on the toolbar GT is an operation about geometric shape, geometric shape is set as the first attribute used for the sample image group GSG.

Subsequently, in step S160, the control unit 80 determines whether an attribute is selected by an operation on the sample image group GSG or not. When no attribute is selected in step S160, the control unit 80 returns to step S140. Meanwhile, when an attribute is selected in step S160, the control unit 80 in step S170 decides the attribute according to this selection, as an attribute used for the image GD. At this time, the control unit 80 causes the storage unit 30 to store the attribute history information D reflecting the result of the decision.

Subsequently, the control unit 80 shifts to step S180. Also, when the instruction to end the display of the menu is given in step S120, when it is not the state where the sample function is set in step S130, or when the operation about an attribute is not carried out in step S140, the control unit 80 shifts to step S180. In step S180, the control unit 80 determines whether an instruction to end the drawing mode is given or not. When the instruction is not given, the control unit 80 returns to step S120. Meanwhile, when the instruction is given, the control unit 80 ends the drawing mode.

Figure 17:
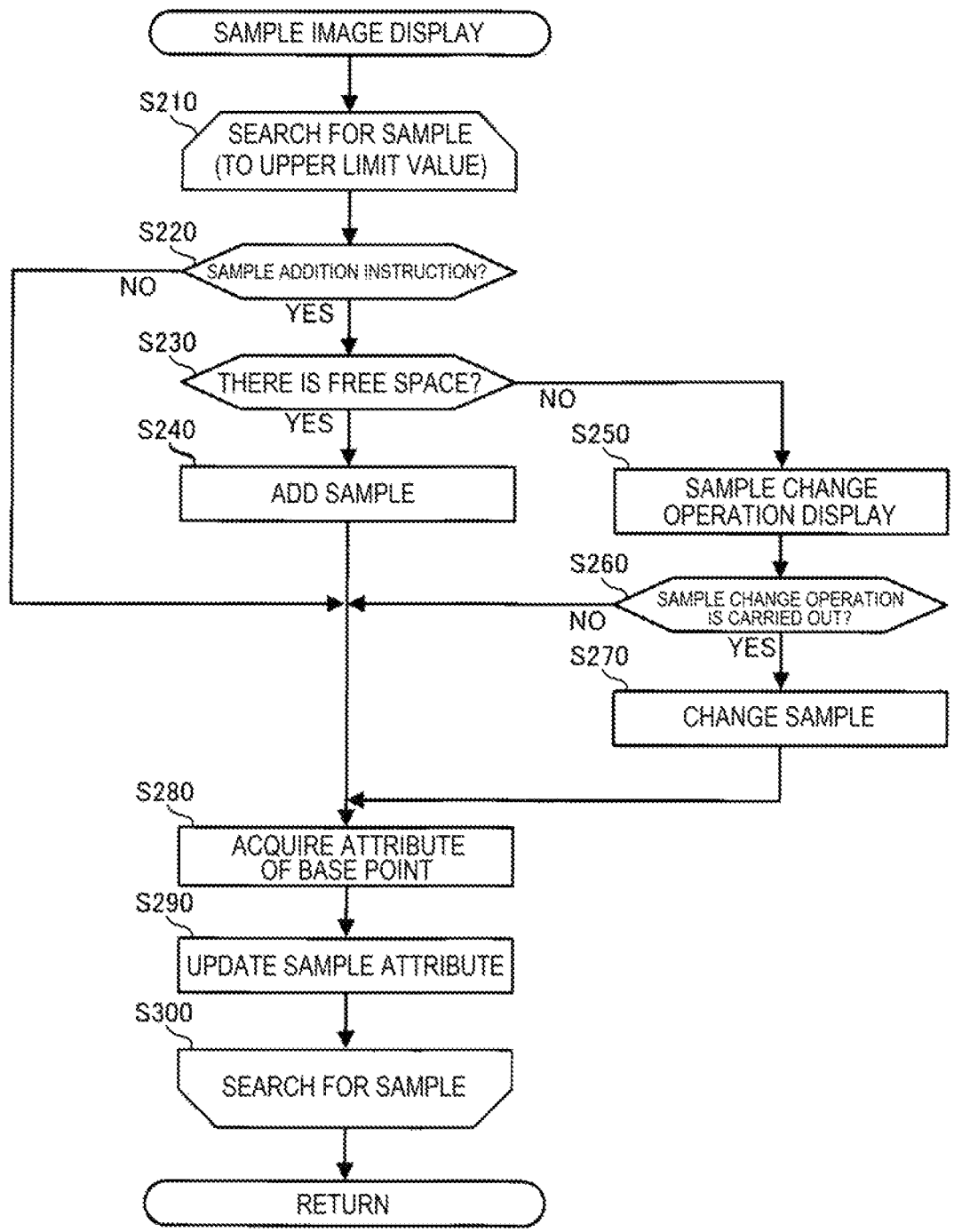
FIG. 17 is a flowchart showing an example of addition and change of an image group in a sample display.

FIG. 17 is a flowchart showing an example of addition and change of an image group in a sample display. First, the control unit 80 in step S220 determines whether a sample addition instruction, which is an instruction to add an image group to the sample image group GSG, is given or not, as shown in FIG. 17. When the sample addition instruction is given in step S220, the control unit 80 determines whether there is a free space that enables addition of an image group to the sample image group GSG or not. When there is a free space in step S230, the control unit 80 adds an image group to be a sample, to the sample image group GSG.

Meanwhile, when there is no free space in step S230, the control unit 80 in step S250 displays the marks M1 and M2 as a sample change operation display. Subsequently, the control unit 80 in step S260 determines whether a sample change operation, which is an operation on the mark M1 or M2, is carried out or not. When the sample change operation is carried out in step S260, the control unit 80 in step S270 changes an image group forming the sample image group GSG to another image group, according to the sample change operation.

After the foregoing step S270, the control unit 80 in step S280 acquires an attribute of a sample image in the area R. Also, when the sample addition instruction is not given in step S220, or when the sample change operation is not carried out in step S260, the control unit 80 shifts to step S280 and acquires the setting of the attribute of the sample image in the area R.

Next, in step S290, the control unit 80 updates the setting of the attribute of the sample image group GSG, based on the setting of the attribute acquired in step S280 and by reflecting the setting of the attribute of the image group according to the addition or change in the setting. The above steps S220 to S290 are repeated until the number of image groups included in the sample image group GSG reaches an upper limit value by steps S210 and S300.

The display system 1 or the display device 10 includes: the display unit 20 displaying an image G on the screen SC as a display surface; the detection unit 60 detecting a position of the pointing unit 90 on the screen SC; and the control unit 80 causing the display unit 20 to display an image GD based on the position detected by the detection unit 60, as described above. The control unit 80 causes the display unit 20 to display a first image group GSG1 including a plurality of sample images GS1 and a second image group GSG2 including a plurality of sample images GS2. The control unit 80 decides a setting of a first attribute and a second attribute used for the image GD based on the position detected by the detection unit 60, according to selection of a sample image GS1 or sample image GS2 included in the first image group GSG1 or the second image group GSG2.

The display method using the display device 10 includes: displaying a first image group GSG1 and a second image group GSG2 on the screen SC; causing one sample image GS1 or GS2 included in the first image group GSG1 or the second image group GSG2 to be selected; deciding a first attribute and a second attribute according to the selection of the one sample image GS1 or GS2; detecting a position of the pointing unit 90 on the screen SC; and displaying an image GD having the decided first attribute and second attribute on the screen SC, based on the detected position.

The first image group GSG1 is scrollable in the direction α, which is an example of the first direction. The plurality of sample images GS1 have different settings of the first attribute from each other and the same setting of the second attribute, which is different from the first attribute. The second image group GSG2 is scrollable in the direction β which is an example of the second direction different from the direction α. The plurality of sample images GS2 have the same setting of the first attribute and different settings of the second attribute from each other.

According to the display system 1, the display device 10, and the display method as described above, the setting of the first attribute and the second attribute used for the image GD based on the position detected by the detection unit 60 can be decided by one operation on the sample image GS1 or the sample image GS2. Therefore, compared with when the number of attributes allocated to an image for the operation is one per image, the number of the operations is smaller and therefore the operation load on the user can be reduced. As the sample image GS1 and the sample image GS2 are laid out on the screen SC, the visibility or the like of the image GD based on the difference in the setting of the first attribute and the second attribute can be presented simultaneously to the user, without actually changing a setting of an attribute of the image GD. Based on this presentation, the setting of the first attribute and the second attribute used for the image GD is decided. This enables a setting of an attribute that meets the user's wish for the image GD.

Scrolling the first image group GSG1 or the second image group GSG2 can change the first attribute or the second attribute of these image groups. Therefore, compared with when the first image group GSG1 and the second image group GSG2 are not scrollable, the number of types of the attribute of the sample image GS1 and the sample image GS2 that can be presented to the user can be increased, even when the number of the sample image GS1 and the sample image GS2 that are simultaneously displayed is reduced. The scroll operation of the first image group GSG1 or the second image group GSG2 can be executed by an operation such as a touch operation with the pointing unit 90 or a gesture operation. This is intuitively easy to understand for the user and achieves excellent operability.

The first image group GSG1 and the second image group GSG2 include sample images GS1 and GS2 that are the same in the area R, where these image groups overlap each other. Therefore, scrolling the first image group GSG1 or the second image group GSG2 can change the first attribute or the second attribute of the sample image GS1 and the sample image GS2 in the area R.

In the embodiment, the first direction is a direction along the straight line L1, which is an example of a first straight line. The second direction is a direction along the straight line L2, which is an example of a second straight light, intersecting the straight line L1. Defining the first direction and the second direction as directions along the straight lines L1 and L2 enables each of the first image group GSG1 and the second image group GSG2 to be scrolled by a linear operation. The linear operation has a simpler movement than a curved operation and therefore achieves excellent operability. An arbitrary straight line, of the straight lines L1, L2, L3, and L4, may be assumed as the first straight line. In this case, an arbitrary straight line other than the first straight line, of the straight lines L1, L2, L3, and L4, may be assumed as the second straight line.

The control unit 80 also causes the display unit 20 to display the third image group GSG3 including a plurality of sample images GS3 and decides a setting of the first attribute, the second attribute, and the third attribute used for the image GD based on the position detected by the detection unit 60, according to selection of a sample image GS1, GS2, or GS3. The third image group GSG3 is scrollable in the third direction, which is different from the first direction and the second direction. The plurality of sample images GS3 have different settings from each other of the third attribute, which is different from the first attribute and the second attribute, and have the same setting of the first attribute and the second attribute. In this configuration, the sample image GS1, the sample image GS2, and the sample image GS3 are displayed on the screen SC. Therefore, the visibility or the like of the image GD based on the difference in the setting of the first attribute, the second attribute, and the third attribute can be presented simultaneously to the user, without actually changing a setting of an attribute of the image GD. This enables determination on an attribute that meets the user's wish for the image GD.

The control unit 80 also can change the position of the area R, where the first image group GSG1 and the second image group GSG2 overlap each other. Therefore, operability on the first image group GSG1 or the second image group GSG2 can be made higher than the case where the position of the area R is fixed. For example, the position of the area R in the left-right directions or the up-down directions can be changed to a position easier to operate for the user, based on the user's dominant arm, height, position, or direction or the like.

The control unit 80 also changes the setting of the first attribute of the second image group GSG2 according to the scrolling of the first image group GSG1, or changes the setting of the second attribute of the first image group GSG1 according to the scrolling of the second image group GSG2. In this configuration, scrolling one image group out of the first image group GSG1 or the second image group GSG2, can change the setting of an attribute of the other image group.

The control unit 80 can also change one or both of the first attribute and the second attribute. Therefore, more display forms can be presented to the user than the case where the first attribute and the second attribute are fixed.

The first attribute or the second attribute used for the sample image GS1 and the sample image GS2 may be color, thickness, or line type, for example, the above attribute a, b, or c. Color, thickness, or line type is suitable for drawing and is therefore suitable as an attribute used for the image GD. Also, color, thickness, or line type tends to influence the visibility or the like of the image GD. Therefore, when the first attribute or the second attribute is color, thickness, or line type, it is advantageous in that the visibility or the like of the image GD is easy to adjust.

The first attribute may be color and the second attribute may be thickness. Color and thickness can provide a greater number of different types in terms of visibility or the like of the image GD than other attributes such as line type. Therefore, when the first attribute is color and the second attribute is thickness, a broader range of adjustment can be provided in terms of the visibility or the like of the image GD than the case where other attributes are used. Thus, for example, when the image GD is displayed as superimposed on the image G, an attribute of the image GD can be properly set with respect to various forms of the image G.

Also, the first attribute may be shape and the second attribute may be color, thickness, or line type. In this case, a first image GS1 and a second image GS2 corresponding to a shape drawn by the user can be displayed with different settings of the attribute of color, thickness, or line type.

In the embodiment, the control unit 80 causes the display unit 20 to display the first image group GSG1 and the second image group GSG2 as superimposed on the image G based on the image information DS from the PC 100, which is an example of an external device. When the image GD is displayed as superimposed on the image G, the image GD may become less visible, depending on the form of the image G. Therefore, superimposing the first image group GSG1 and the second image group GSG2 on the image G is useful when displaying the image GD as superimposed on the image G.

The display device 10 has the storage unit 30 storing the attribute history information D, which is information about an attribute history of the image GD based on the position detected by the detection unit 60. The control unit 80 decides a setting of the first attribute or the second attribute used for the first image group GSG1 or the second image group GSG2, based on the attribute history information D. Therefore, the first image group GSG1 and the second image group GSG2 can be displayed, using a setting of an attribute that the user is highly likely to use. Thus, compared with when an attribute of the first image group GSG1 and the second image group GSG2 is set without using the attribute history information D, other operations for changing the setting of the attribute used for the first image group GSG1 and the second image group GSG2 can be reduced.

3. MODIFICATION EXAMPLE

The display device and the display system according to the present disclosure have been described above, based on the illustrated embodiment. However, the present disclosure is not limited to this. The configuration of each part of the present disclosure can be replaced by an arbitrary configuration that achieves a function similar to that in the foregoing embodiment. Also, an arbitrary configuration can be added. Moreover, the present disclosure may include a combination of arbitrary configurations in the embodiment.

In the above embodiment, a configuration where each of the first direction and the second direction as the scrolling directions of the first image group GSG1 and the second image group GSG2 is along a straight line is described as an example. However, the first direction and the second direction are not limited to this configuration. For example, at least one of the first direction and the second direction may be not along a straight line. At least one of the first direction and the second direction may be along a circumference.

Figure 18:
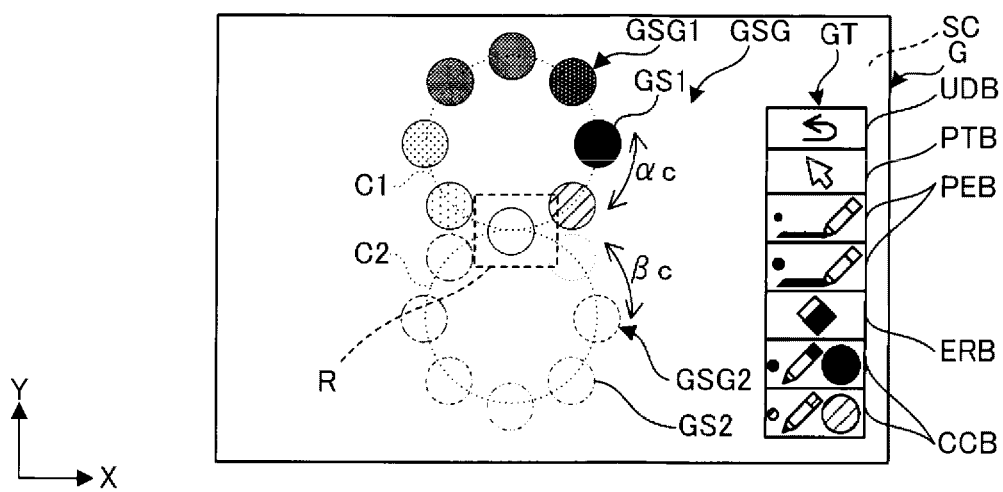
FIG. 18 illustrates a sample display including a first image group and a second image group according to a modification example.

FIG. 18 illustrates a sample display including a first image group GSG1 and a second image group GSG2 according to a modification example. The first image group GSG1 shown in FIG. 1 includes a plurality of sample images GS1 arranged along a circumference C1 and is scrollable in directions αc along the circumference C1. The second image group GSG2 shown in FIG. 18 includes a plurality of sample images GS2 arranged along a circumference C2 and is scrollable in directions βc along the circumference C2. The circumference C1 is an example of a first circumference. The directions =c are an example of the first direction. The circumference C2 is an example of a second circumference intersecting the first circumference. The directions βc are an example of the second direction. In this configuration, each of the first image group GSG1 and the second image group GSG2 can be scrolled by a curved operation. The curved operation is advantageous in that it is easily identifiable from other operations such as a single touch operation, thus making operation error less likely to occur. In the configuration shown in FIG. 18, the entirety of the circumferences C1 and C2 is included within the image G. However, this is not limiting. For example, a part of one or both of the circumferences C1 and C2, that is, an arc thereof, may be included within the image G.

In the above embodiment, a configuration where the sample image group GSG is displayed in response to an operation on the pen button PEB or the color choice button CCB is described as an example. However, this configuration is not limiting. The sample image group GSG may be displayed, for example, in response to an operation on another button in the toolbar GT or a button other than the toolbar GT, or may be displayed in response to the start of execution of the drawing mode.

In the above embodiment, the case where the display device 10 is a projector is described as an example. However, the display device according to the present disclosure is not limited to a projector and may be, for example, a touch panel-type display device.

What is claimed is:

1. A display device comprising:
   a projection system configured to display an image on a display surface;
   a sensor configured to detect a position of a pointing unit on the display surface; and
   one or more processors programmed to cause the projection system to display an image based on the position detected by the sensor,
   wherein the one or more processors are programmed to:
      cause the projection system to display a first image group including a plurality of sample images having visually identifiable characteristics, the visually identifiable characteristics representing different settings of a first attribute from each other and a same setting of a second attribute that is different from the first attribute, the first image group being scrollable in a first direction, and a second image group including a plurality of sample images having visually identifiable characteristics, the visually identifiable characteristics representing a same setting of the first attribute and different settings of the second attribute from each other, the second image group being scrollable in a second direction that is different from the first direction, wherein the first image group and the second image group are presented simultaneously to a user, and
      decide a setting of the first attribute and the second attribute used for the image based on the position detected by the sensor, according to selection of a sample image included in the first image group or the second image group,
   wherein the first direction is a direction along a first circumference, and
   wherein the second direction is a direction along a second circumference intersecting the first circumference.

2. The display device according to claim 1, wherein the first image group and the second image group include a same sample image in an area where the first image group and the second image group overlap each other.

3. The display device according to claim 1, wherein
the first direction is a direction along a first straight line, and
the second direction is a direction along a second straight line intersecting the first straight line.

4. The display device according to claim 1, wherein the one or more processors are programmed to:
cause the projection system to display a third image group including a plurality of sample images having visually identifiable characteristics, the visually identifiable characteristics representing different settings from each other of a third attribute that is different from the first attribute and the second attribute and a same setting of the first attribute and the second attribute, the third image group being scrollable in a third direction that is different from the first direction and the second direction, and
decide a setting of the first attribute, the second attribute, and the third attribute used for the image based on the position detected by the sensor, according to selection of a sample image included in the first image group, the second image group, or the third image group.

5. The display device according to claim 1, wherein the one or more processors are programmed to change a position of an area where the first image group and the second image group overlap each other.

6. The display device according to claim 1, wherein the one or more processors are programmed to change the setting of the first attribute of the second image group according to scrolling of the first image group or changes the setting of the second attribute of the first image group according to scrolling of the second image group.

7. The display device according to claim 1, wherein the one or more processors are programmed to change one or both of the first attribute and the second attribute.

8. The display device according to claim 1, wherein the first attribute or the second attribute is color, thickness, or line type.

9. The display device according to claim 8, wherein
the first attribute is color, and
the second attribute is thickness.

10. The display device according to claim 8, wherein
the first attribute is shape, and
the second attribute is color, thickness, or line type.

11. The display device according to claim 1, wherein the one or more processors are further programmed to cause the projection system to display the first image group and the second image group as superimposed on an image based on image information from an external device.

12. The display device according to claim 1, further comprising
a memory storing information about an attribute history of the image based on the position detected by the sensor, wherein
the one or more processors are programmed to decide a setting of the first attribute or the second attribute used for the first image group or the second image group, based on the information.

13. A display method comprising:
displaying, on a display surface, a first image group including a plurality of sample images having visually identifiable characteristics, the visually identifiable characteristics representing different settings of a first attribute from each other and a same setting of a second attribute that is different from the first attribute, the first image group being scrollable in a first direction, and a second image group including a plurality of sample images having visually identifiable characteristics, the visually identifiable characteristics representing a same setting of the first attribute and different settings of the second attribute from each other, the second image group being scrollable in a second direction that is different from the first direction, wherein the first image group and the second image group are presented simultaneously to a user;
causing one sample image included in the first image group or the second image group to be selected;
deciding the first attribute and the second attribute according to the selection of the one sample image;
detecting a position of a pointing unit on the display surface; and
displaying, on the display surface, an image having the first attribute and the second attribute that are decided, based on the detected position,
wherein the first direction is a direction along a first circumference, and
wherein the second direction is a direction along a second circumference intersecting the first circumference.

14. A display system comprising:
a projection system displaying an image on a display surface;
a sensor detecting a position of a pointing unit on the display surface; and
one or more processors programmed to cause the projection system to display an image based on the position detected by the sensor,
wherein the one or more processors are programmed to cause the projection system to
display a first image group including a plurality of sample images having visually identifiable characteristics representing, the visually identifiable characteristics representing different settings of a first attribute from each other and a same setting of a second attribute that is different from the first attribute, the first image group being scrollable in a first direction, and a second image group including a plurality of sample images having visually identifiable characteristics, the visually identifiable characteristics representing a same setting of the first attribute and different settings of the second attribute from each other, the second image group being scrollable in a second direction that is different from the first direction, wherein the first image group and the second image group are presented simultaneously to a user, and
decide a setting of the first attribute and the second attribute used for the image based on the position detected by the sensor, according to selection of a sample image included in the first image group or the second image group,
wherein the first direction is a direction along a first circumference, and
wherein the second direction is a direction along a second circumference intersecting the first circumference.

* * * * *